July 3, 1962 S. F. KOTECKI 3,042,787
WELDING METHOD AND APPARATUS
Filed Jan. 6, 1960 3 Sheets-Sheet 1
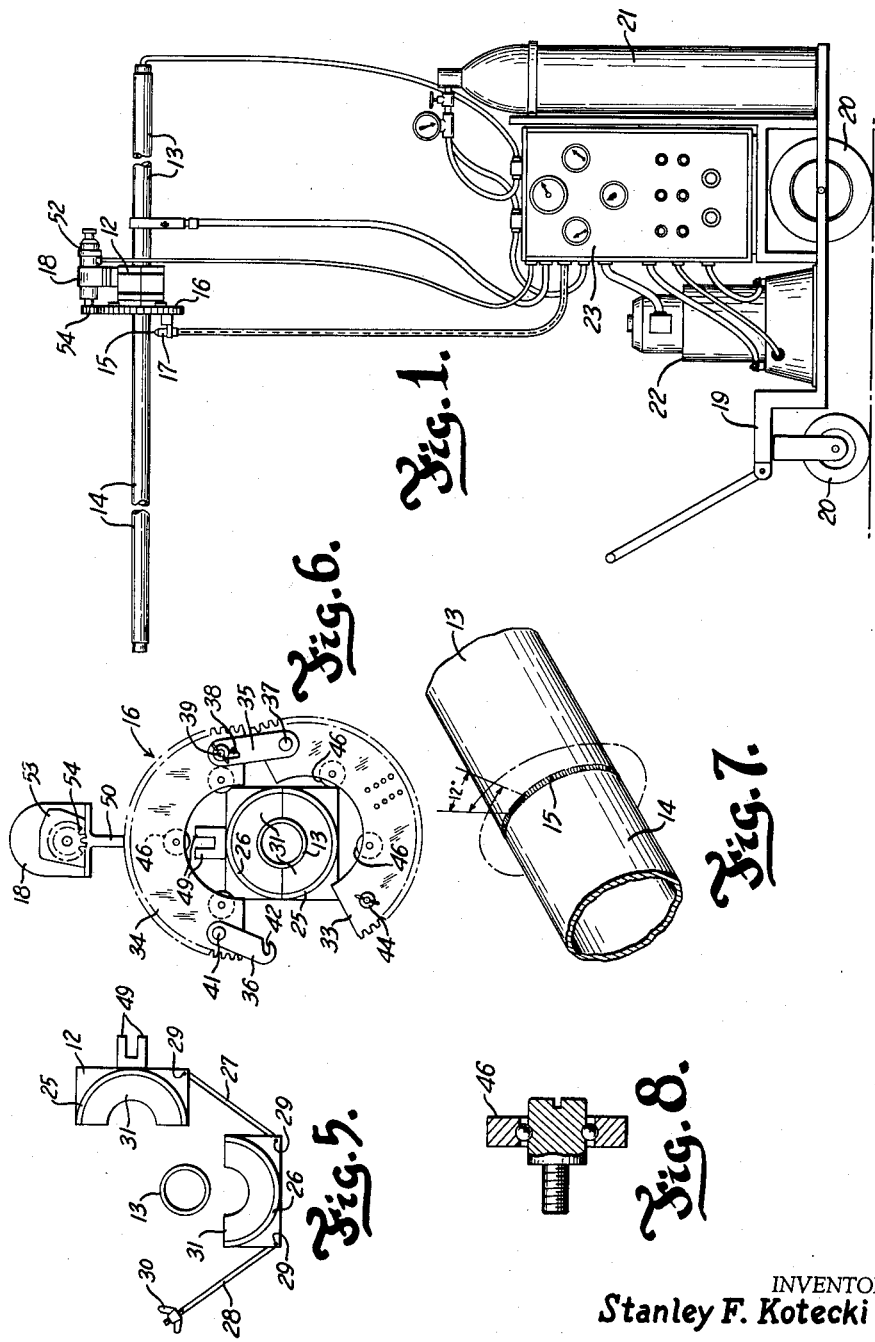
INVENTOR.
Stanley F. Kotecki
BY
Lieber, Lieber & Nilles
Attorneys

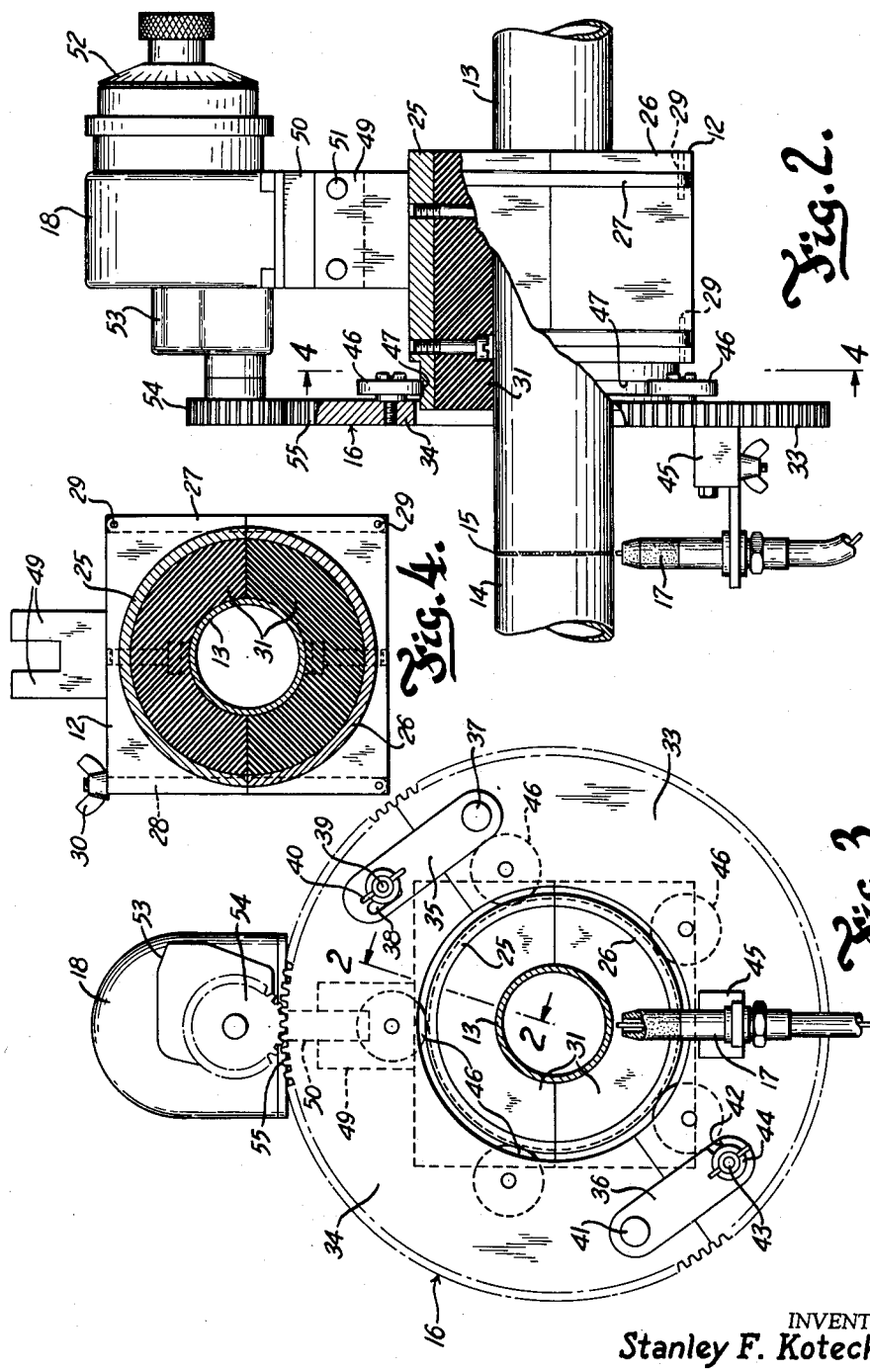

INVENTOR.
Stanley F. Kotecki

United States Patent Office 3,042,787
Patented July 3, 1962

---

3,042,787
WELDING METHOD AND APPARATUS
Stanley F. Kotecki, Milwaukee, Wis., assignor to Cyclo-Magic, Inc., Milwaukee, Wis., a corporation of Wisconsin
Filed Jan. 6, 1960, Ser. No. 746
7 Claims. (Cl. 219—60)

This invention relates generally to improvements in the art of welding, and it relates more specifically to improvements in the construction and operation of devices for producing annular welds on circular articles.

The primary object of the present invention is to provide improved equipment for producing exceedingly uniform, smooth and strong welds on circular articles such as metal tubes or tanks of diverse diameters and wall thicknesses.

Some of the more specific but important objects of the invention are as follows:

To provide an improved unit for automatically producing effective annular welds rapidly and with utmost precision.

To provide an improved welding device and method capable of welding relatively thin metal efficiently and without the formation of craters or jagged protrusions.

To provide an improved welder especially adapted to unite the abutting adjacent ends of tubular articles, and which obviates the necessity of grinding or dressing the welded joints after initial formation of the weld.

To provide an improved automatically functioning mechanism and method for welding cylindrical tubes or tanks of various diameters and formed of sheet metal having different thicknesses.

To provide a welder unit which is quickly and conveniently adjustable to meet varying conditions, such as varying characteristics of the materials from which the articles which are to be welded are constructed.

To provide an improved welding machine, which is extremely flexible in its adaptations and uses, and improved controls for effecting actuation of such devices.

To provide a simple but extremely durable welding outfit of the "Heli-arc" type which produces perfect welds without the addition of weld or filler rod, or any other metal.

To provide an improved automatic welder which when properly installed performs its function without further attention, and which can be quickly applied to or removed from the work and operated at readily adjustable speeds to effectively perform the improved method.

These and other still more specific objects and advantages of the invention will be apparent in the course of the following description.

A clear conception of the features constituting the present improvement, and of the construction and operation of a welding device embodying the invention, may be had by referring to the drawings accompanying and forming a part of this specification wherein like reference characters designate the same or similar parts in the various views.

FIG. 1 is a side elevation of a complete welding unit, showing the improved device applied to adjoining pipe line sections, which are to be united by an annular weld, and also disclosing the equipment for controlling and actuating the welder;

FIG. 2 is an enlarged part-sectional similar side elevation of the improved welding device alone, showing the same likewise applied to fragments of two adjoining pipe sections and the cross-section having been taken along the line 2—2 of FIG. 3;

FIG. 3 is a similarly enlarged end view of the welding device shown in FIG. 2, looking toward the right and showing the pipe in section;

FIG. 4 is a likewise enlarged transverse vertical section through the frame assemblage of the same welding device, taken along the line 4—4 of FIG. 2, and showing the frame clamped to the pipe;

FIG. 5 is a reduced exploded end view of the two-part frame of the improved welding device, illustrating the manner in which these pivotally interconnected parts may be applied to or removed from a pipe;

FIG. 6 is a similarly reduced exploded end view of the two-part torch supporting carriage of the same welding device and of the carriage propelling motor, illustrating the manner in which these elements may be applied to or removed from the frame;

FIG. 7 is a perspective view of a portion of two abutting pipe sections united by an annular weld and illustrating the manner in which the ends of the weld overlap.

FIG. 8 is an enlarged central section through one of the anti-friction rollers for guiding the rotary torch carriage relative to the frame.

Figure 9:
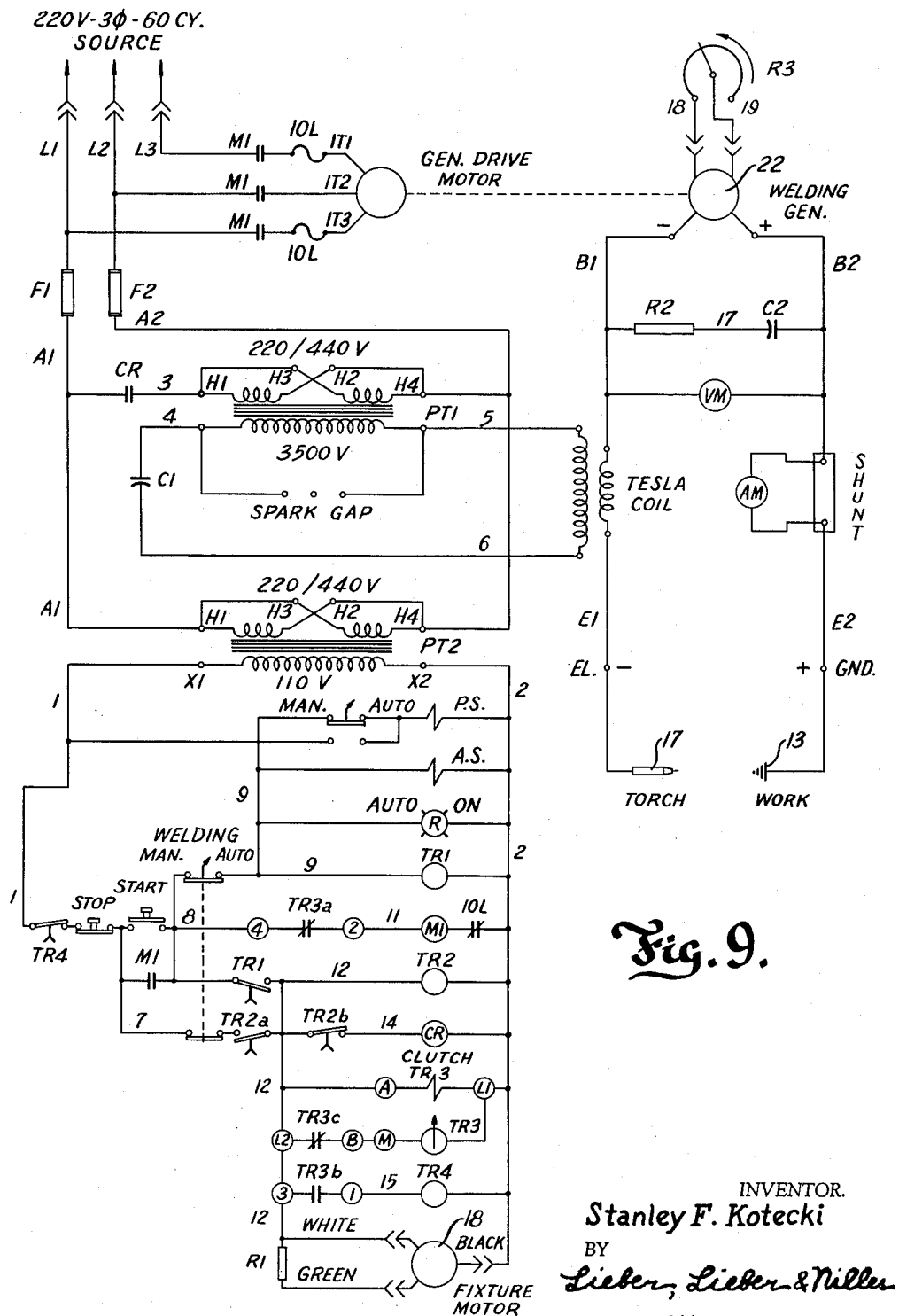
FIG. 9 is a diagram of the electrical control system for effecting operation of the propelling motor, torch carriage, and welding torch of the improved device.

While the invention has been illustrated and described herein as having been applied to a pipe welding system wherein the frame of the device is clamped to the pipe and in which a specific type of torch is employed and travels about the pipe periphery when welding, it is not intended to limit all of the improvements to such a system or method; and it is also contemplated that specific descriptive terms employed herein be given the broadest possible interpretation consistent with the disclosure.

Referring to the drawings, the portable equipment shown in FIGURE 1 comprises in general an improved welding device having a frame 12 attachable to a circular article such as one section 13 of a pipe which is to be united with an alined section 14 by an annular weld 15; an annular carriage 16 supported for rotation relative to the frame 12 and having a welding torch 17 suspended therefrom; an electric motor 18 mounted upon the frame 12 and being drivingly connected to the carriage 16; a mobile vehicle 19 supported on three wheels 20 and having thereon an inert gas supply tank 21; a motor driven welding generator 22 for activating the torch 17; and a gauge panel and switch board 23 for effecting control of the system.

The improved welding device constituting the present improvements, is shown more in detail in FIGS. 2 to 4 inclusive, and the main frame 12 is preferably formed of upper and lower pivotally united approximately semi-circular metal parts 25, 26 respectively, which are separably interconnected by a part of hinge links 27 on one side and by another clamping link 28 on the opposite side thereof. The hinge links 27 are permanently swingably attached to the parts 25, 26 by pivot pins 29, while the link 28 has its lower end likewise swingably attached to the lower frame part 26 with its upper end being detachably attachable to the upper frame part 25 by a thumb nut 30, which can be released to effect separation of the parts 25, 26 as in FIG. 5 but may be tightened to clamp the frame 12 upon a pipe section 14. The main frame 12 also comprises semi-circular liners 31 adapted to be snugly confined within the parts 25, 26 by screws and the internal arcuate surfaces of which fit the pipe or article to be welded but these liners 31 can be replaced by others having internal curved surfaces of different radii in order to enable the frame 12 to be clamped to cylindrical articles of various diameters.

The annular carriage 16 is also preferably formed of a pair of swingably united semi-circular parts 33, 34 which are separably interconnected by links 35, 36 so as to permit the parts to either clamp together to form a complete ring as in FIGS. 2 and 3, or swing apart as in FIG.

6. The link 35 is pivotally attached to an end of the carriage part 33 by a pin 37 and has a T-shaped slot 38 in its swinging end cooperable with a stud 39 and thumb nut 40 at the adjacent end of the part 34; and the link 36 is pivotally attached to the opposite end of the carriage part 34 by a pin 41 and has a hook slot 42 in its swinging end detachably cooperable with a stud 43 and thumb nut 44 at the adjacent end of the part 33. The welding torch 17 which is of the "Heli-arc" type activated by the inert gas and electric arc method, is secured in radial position to the carriage part 33 means of a block 45 and is adjustable radially for proper cooperation with pipes or other circular articles of different diameters. The annular carriage 16 with the torch 17 thus applied thereto, is mounted for a rotation about the frame supporting pipe section 13 by means of an annular series consisting of an odd number of equally spaced anti-friction rollers 46 journalled on stub-shafts secured to the carriage parts 33, 34, and which coact with an annular track 47 formed on the end of the frame 12 as depicted in FIGS. 2 and 3.

The upper part 25 of the main frame 12 is also provided with a pair of integral laterally spaced ears 49 to which the base 50 of the carriage propelling motor 18 is firmly but detachably secured by pins 51, and this motor has a speed regulating dial 52 at one end while its opposite end is provided with a speed reducer 53 for transmitting rotary motion to a pinion 54, see FIGS. 2, 3, and 4. When the motor 18 and the torch carriage 16 of the welding device, have been assembled for use, the pinion 54 meshes with an annular series of gear teeth 55 formed on the periphery of the carriage segments or parts 33, 34 so that operation of the electric motor 18 will cause the carriage 16 to rotate upon the track 47 on the frame 12 and will cause the torch 17 to revolve about the central axis of the pipe to produce the annular weld 15; and the odd number of rollers 46 none of which are disposed diametrically opposite to any other of the series, serves to prevent lateral tilting of the carriage and to maintain it accurately centralized relative to the work.

The control equipment mounted upon the vehicle 19 may be varied considerably depending upon the type of welds to be produced and the characteristics of the articles to be welded, and in the system illustrated the tank 21 may be filled with inert gas such as Argon or Helium, although nitrogen or carbon dioxide may be used when welding certain metals. The inert gas flow regulation may be effected with a standard combination pressure and flow regulator having a flow meter showing the flow of gas in cubic feet per hour; and the welding generator 22 may be any standard direct current type having welding current characteristics compatible to the type and thickness of the metal. For very thin walled tubes an aircraft type of welder having an additional control rheostat and receptacle for its generator circuit, is desirable. The panel board is specially designed to automatically and effectively perform each individual step of the improved method and to stop the equipment when required, and the various auxiliary electrical devices shown diagrammatically in FIG. 9 function as follows:

With the improved welding device properly applied to the work the operator pushes the start button which causes contactors MI to close, and the closing of contactors MI simultaneously activates the automatic process as follows: The magnetic starter MI closes and starts the welding generator, solenoid valves PS and AS are energized thus delivering inert gas from the tank 21 to the torch 17 and to the interior of the pipe 13, the red indicator light ignites indicating that the automatic process is in progress, and timer TR1 begins to mark time.

When the timer TR1 runs out it closes the TR1 contacts thereby simultaneously energizing and starting the timer TR2, closing the relay CR, activating the clutch TR3, starting the timer TR3, and starting the motor 18. This causes the timer TR2 to begin marking time while the relay CR closes the CR contacts and energizes the step up transformer PT1 which steps up the voltage in the lines 5 and 6 to 3500 v. This voltage is subsequently stepped up in the tesla coil to approximately 15,000 v. causing a high frequency spark to jump across from the electrode in the torch 17 to the work due to ionization of the atmosphere between the torch and the work. This spark carries the D.C. welding current which creates an arc for producing the weld 15, while the capacitors C1 and C2 and the resistor R2 protect the welding generator and transformer PT1 against possible damage from the high frequency current.

The clutch and timer TR3 begin to mark time while the motor 18 drives the carriage 16 and revolves the torch 17 around the pipe sections 13, 14, and when the timer TR2 has run out it closes the switch TR2$a$ and opens the switch TR2$b$ thus opening the relay CR and de-energizing the transformer PT1 thereby interrupting the high frequency spark. When the time TR3 runs out, the switch TR3$a$ opens thus de-energizing the starter M1 and stopping the generator 22 which coasts sufficiently to retard the welding current and thereby eliminate crater formation in the weld. This is a very important step in the improved welding method and enables formation of exceptionally smooth and sanitary welds. The contacts TR2 and TR3$c$ open while the switch TR3$b$ closes and starts the timer TR4. When this timer runs out the switch TR4 opens whereupon the solenoid valves PS and AS are de-energized and close thereby stopping the flow of Argon gas and the red indicator light marked "auto on" extinguishes while the motor 18 stops and all timers and switches are automatically reset to cycle starting position.

The operator will be supplied with charts setting forth proper settings of the various control devices for welds to be applied to articles formed of diverse materials, and having different diameters and wall thicknesses, and other characteristics. The speed control dial 52 of the motor 18 can be adjusted to accurately produce any desired rate of advancement of the torch 17, and the welding generator controls may be readily set to the proper voltage and amperage, but it is important to have the high frequency current shut off after being on only a few seconds in order to avoid the formation of porous welds 12. With the carriage rotating at a selected speed the flow of inert gas to the welding arc and to the internal purging zone within the weld continues during the entire welding operation, and in order to eliminate craters at the ends of the welds 15 it is desirable to have the torch 17 travel far enough to produce overlapping of the weld ends as indicated in FIG. 7 wherein an overlap of 12° has been allowed when welding 4" pipe section 13, 14, the amperage being simultaneously retarded in the overlapped area.

It is to be noted that when the apparatus has been properly assembled and pre-set, identical welds will be produced on similar articles of like diameter, so that pipe lines of various lengths can be welded, by merely releasing the frame parts 25, 26 from the pipe after the formation of each weld 15 and by thereafter shifting the equipment to a subsequent location with the aid of the transporting vehicle. The improved welding device is of light weight and easily transferable, and the frame liners can be readily replaced to fit articles such as pipes having different diameters while the torch 17 is also radially adjustable to properly cooperate with the welding zone, thus making the device flexible in its adaptations. While the automatic functioning of the equipment is desirable when producing a number of identical welds, the controls may also be manually actuated when producing welds by the manual arc process. The two part hinged formation of the main frame 12 and of the torch carriage 16 also facilitates application of the improved welding device to and removal thereof from the work, while the use of an odd number of anti-friction rollers or ball bearing races 46 for supporting the carriage 16 upon the annular track 47 effectively maintains this carriage accurately centralized relative to the pipe axis by making the rollers diametrically offset, and the improved assemblage has proven highly satisfactory and successful in actual use.

Various modes of carrying out the invention are contemplated as being within the scope of the following claims particularly pointing out and distinctly claiming the subject matter which is regarded as the invention.

I claim:

1. A welding device comprising a frame formed of a pair of complementary sections attachable to an article upon which an annular weld is to be applied, each of said frame sections having mating semi-circular grooves forming an annular track disposable coaxially of the contemplated weld and having diametrically opposed joints, a carriage provided with an annular series of at least three diametrically offset rollers journalled thereon and coacting directly with said track to guide the carriage for rotation about the axis of the proposed annular weld, a motor mounted upon said frame and being drivingly connected to said carriage, and a welding member revolvable by said carriage along said article to apply the weld thereto.

2. A welding device comprising, a frame formed to embrace a circular article upon which an annular weld is to be applied, said frame having thereon an annular track disposable coaxially of the contemplated weld and having diametrically opposed joints, a carriage provided with an annular odd numbered series of equally spaced anti-friction rollers journalled thereon and guided within said track to connect the frame and carriage for relative rotation with respect to the axis of the proposed annular weld, a motor mounted upon said frame with its drive shaft lying parallel to the axis of said circular article, said motor shaft being geared to the periphery of said carriage, and a welding torch mounted upon said carriage and being cooperable with the article to produce the annular weld during said relative rotation of the frame and carriage.

3. A welding device comprising, a frame having complementary pivotally connected parts formed to interchangeably receive semi-circular liners of diverse sizes for clampingly embracing a circular article upon which an annular weld is to be applied, said frame having thereon an annular track disposable coaxially of the prospective weld, an annular carriage having peripheral gear teeth and provided with an annular series of anti-friction bearing elements revolvable upon said track during rotation of the carriage, a motor mounted upon said frame and being drivingly connected to the carriage through the peripheral teeth thereof, and a welding torch revolvable by said carriage and being cooperable with the article clamped in said frame to produce the annular weld.

4. A welding device comprising, a frame attachable to an article upon which an annular weld is to be applied, said frame having thereon a circular track disposable coaxially of the prospective annular weld, an annular carriage formed of pivotally interconnected sector sections swingable toward and away from the axis of the proposed annular weld and formed with peripheral gear teeth, said carriage also being provided with a series of anti-fricton bearing elements cooperable with said track, a motor mounted upon said frame with its drive shaft disposed parallel to the axis of the prospective weld and being drivingly connected to said carriage through a pinion meshing with the peripheral teeth of said carriage, and a welding torch mounted upon said carriage and being revolvable thereby about the article to apply the annular weld thereto.

5. A welding device comprising a frame having a pair of separable parts each provided with a detachable semi-circular liner clampingly engageable with a circular article to be welded, said frame having thereon an annular track, an annular carriage also having a pair of separable parts and being provided with bearing elements engageable with said frame track, a motor detachably secured to one of said frame parts with its drive shaft parallel to the axis of the work and being drivingly connected to the periphery of said carriage, and a welding torch revolvable by said carriage to apply a weld to the article.

6. A welding device comprising a frame having a pair of separable parts each provided with a detachable semi-circular liner clampingly engageable with a circular article to be welded, said frame having thereon an annular track, an annular carriage having peripheral gear teeth and being provided with bearing elements revolvable about said frame track, a motor mounted directly upon said frame with its drive shaft parallel to the axis of said circular article and provided with a pinion meshing directly with said carriage teeth to revolve the carriage, and a welding torch suspended from said carriage and being revolvable thereby to apply a weld to the article.

7. A welding device comprising a frame having an annular track thereon, a torch carriage having thereon a series of anti-friction elements coacting with said track, said frame and carriage each having a pair of semi-circular hingedly united parts disposable about an article to be welded by the carriage torch, and a motor mounted on said frame with its drive shaft parallel to the frame and carriage axes and being drivingly connected to the periphery of said carriage.

References Cited in the file of this patent

UNITED STATES PATENTS

| 1,949,251 | Gilbert | Feb. 27, 1934 |
|---|---|---|
| 2,013,630 | Goldsborough | Sept. 3, 1935 |
| 2,151,378 | Elsey et al. | Mar. 21, 1939 |
| 2,227,194 | Moise et al. | Dec. 31, 1940 |
| 2,817,745 | Pilia et al. | Dec. 24, 1957 |
| 2,914,653 | Ernst | Nov. 24, 1959 |
| 2,956,147 | Baker | Oct. 11, 1960 |